(12) United States Patent
Roberts et al.

(10) Patent No.: US 8,131,462 B2
(45) Date of Patent: *Mar. 6, 2012

(54) VEHICLE GUIDANCE AND SENSOR BIAS DETERMINATION

(75) Inventors: Peter James Roberts, Brisbane (AU); William James Keller, Brisbane (AU)

(73) Assignee: Leica Geosystems AG, Heerbrugg (CH)

( * ) Notice: Subject to any disclaimer, the term of this patent is extended or adjusted under 35 U.S.C. 154(b) by 910 days.

This patent is subject to a terminal disclaimer.

(21) Appl. No.: 12/039,542

(22) Filed: Feb. 28, 2008

(65) Prior Publication Data
US 2009/0222204 A1    Sep. 3, 2009

(51) Int. Cl.
*G01C 21/00* (2006.01)
(52) U.S. Cl. ........................................... 701/213
(58) Field of Classification Search .................. 701/207, 701/213–215, 220; 342/357.2
See application file for complete search history.

(56) References Cited

U.S. PATENT DOCUMENTS

| | | | |
|---|---|---|---|
| 6,088,653 A | 7/2000 | Sheikh et al. | |
| 6,101,430 A | 8/2000 | Fuller et al. | |
| 6,658,354 B2 | 12/2003 | Lin | |
| 6,754,584 B2 | 6/2004 | Pinto et al. | |
| 7,139,651 B2 | 11/2006 | Knowlton et al. | |
| 7,328,104 B2 * | 2/2008 | Overstreet et al. | 701/220 |
| 2003/0112171 A1 | 6/2003 | Michaelson et al. | |
| 2008/0077284 A1 | 3/2008 | Swope | |
| 2009/0099774 A1* | 4/2009 | Takac et al. | 701/216 |

OTHER PUBLICATIONS

Berdjag et al., DGPS/INS data fusion for land navigation, 7th International Conference on Information Fusion 2004, Jun. 28, 2004 to Jul. 1, 2004, Stockholm, Sweden; http://www.fusion2004.foi.se/papers/IF04-0881.pdf.

* cited by examiner

*Primary Examiner* — Kim T Nguyen
(74) *Attorney, Agent, or Firm* — Maschoff Gilmore & Israelsen

(57) ABSTRACT

Systems and methods for guiding a vehicle and vehicle sensor bias determination methods are disclosed. A method for guiding a vehicle includes a primary antenna of a primary survey-grade GNSS-receiver and a secondary antenna of a secondary GNSS-receiver mounted to the vehicle, which are at least temporarily receiving GNSS-signals of a global positioning system. A plurality of physical sensors mounted to the vehicle generate physical data indicative of respective measured physical parameters of at least part of the vehicle. The method includes de-biasing the physical data and applying a recursive statistical estimator, such as a Kalman filter, to the de-biased physical data and an output of the primary and secondary GNSS-receivers to determine a position and velocity of the vehicle.

14 Claims, 3 Drawing Sheets

VEHICLE GUIDANCE AND SENSOR BIAS DETERMINATION

CROSS-REFERENCE TO RELATED APPLICATIONS

Not applicable.

BACKGROUND

In many geodetic applications, methods and systems for position determination of a geodetic instrument are used, which are based on global positioning systems, such as, for example, GPS, GLONASS or the European Galileo system. These GNSS systems are based on the reception of satellite signals.

The requirements of vehicle guidance or navigation, e.g. in agricultural or mining applications in particular, have subtle differences to that of surveying, including a much stronger requirement for continuously available positioning.

A typical approach is to combine GNSS-sensors with sensor data, e.g. from magnetometers, acceleration sensors or angular rate sensors, in order to derive further information of the vehicle's position, attitude or the variation of these parameters. However, most sensors produce biased data with a dependency on several factors, e.g. time or temperature. Therefore, the application of static bias values leads to a limited description of sensor performance, especially with respect to long term variations.

The most problematic movement to determine is the roll, i.e. a rotational movement about the x-axis of the vehicle. Roll is routinely determined through existing techniques using two high performance GPS receivers. However, these solutions have some disadvantages including the following:
- too expensive or complex for many applications;
- suffer from too much latency; and
- are vulnerable to all the issues affecting GNSS-only systems including insufficient satellite availability, poor Geometric Dilution of Precision (GDOP) and interruptions to base communications.

Low latency roll is also routinely determined through existing techniques using three orthogonally mounted accelerometers, where some degree of accuracy is achieved through factory calibration of the sensors for temperature changes. However, these solutions also have some drawbacks including the following:
- too expensive or complex for many applications, because calibration and sensor selection are further steps added to the process;
- not sufficiently accurate due to an imperfectly repeatable relationship between temperature and sensor bias;
- do not address inevitable sensor bias drift over time due to crystal aging; and
- without a rapid and reliable means for detecting a sensor that performs significantly out of specification early in its life as can occur with Micro-Electro-Mechanical System (MEMS) sensors.

BRIEF SUMMARY OF SEVERAL EXAMPLE EMBODIMENTS

According to one aspect, although not necessarily the only or indeed the broadest aspect, embodiments of the present invention reside in a method for guiding a vehicle including a primary antenna of a primary survey-grade GNSS-receiver and a secondary antenna of a secondary GNSS-receiver mounted to the vehicle at least temporarily receiving GNSS-signals of a global positioning system and a plurality of physical sensors generate physical data indicative of respective measured physical parameters of at least part of the vehicle. The method includes de-biasing the physical data. The method further includes applying a recursive statistical estimator to the de-biased physical data and an output of the primary and secondary GNSS-receivers to determine a position and velocity of the vehicle.

According to another aspect, embodiments of the present invention reside in a vehicle guidance system including a primary survey-grade GNSS-receiver with a primary antenna and a secondary GNSS-receiver with a secondary antenna for at least temporarily receiving GNSS-signals of a global positioning system. The vehicle guidance system further includes a plurality of physical sensors for generating physical data indicative of respective measured physical parameters of at least part of the vehicle. The vehicle guidance system further includes a data processing unit coupled to be in communication with the primary GNSS-receiver, the secondary GNSS-receiver and the plurality of physical sensors, the data processing unit applying a recursive statistical estimator to de-biased physical data and output of the primary and secondary GNSS-receivers to determine a position and velocity of the vehicle.

According to a further aspect, embodiments of the present invention reside in an apparatus for guiding a vehicle. The apparatus for guiding a vehicle includes computer readable program code components configured to cause at least temporary reception of GNSS-signals of a global positioning system by a primary antenna of a primary survey-grade GNSS-receiver and a secondary antenna of a secondary GNSS-receiver mounted to the vehicle. The apparatus for guiding a vehicle further includes computer readable program code components configured to cause a the generation of physical data indicative of respective physical parameters of at least part of the vehicle measured by a plurality of physical sensors. The apparatus for guiding a vehicle further includes computer readable program code components configured to cause de-biasing of the physical data. The apparatus for guiding a vehicle further includes computer readable program code components configured to cause determination of a position and velocity of the vehicle by applying a recursive statistical estimator to the de-biased physical data and an output of the primary and secondary GNSS-receivers.

In some embodiments, the system, method and apparatus include estimating a bias in the physical data, or a quantity derived therefrom. Estimating a bias in the physical data may include windowed averaging in the relevant parameter domain, such as the acceleration or angle domain, and may include taking the difference of sample means.

These and other features of the present invention will become more fully apparent from the following description and appended claims, or may be learned by the practice of the invention as set forth hereinafter.

BRIEF DESCRIPTION OF THE DRAWINGS

To further clarify various aspects of embodiments of the present invention, a more particular description will be rendered by reference to specific embodiments which are illustrated in the appended drawings. It is appreciated that these drawings depict only examples of embodiments of the invention and are therefore not to be considered limiting of its scope. Embodiments of the invention will be described and explained with additional specificity and detail through the use of the accompanying drawings in which.

DETAILED DESCRIPTION OF SEVERAL EMBODIMENTS

The principles of the embodiments described herein describe the structure and operation of several examples used to illustrate the present invention. It should be understood that the drawings are diagrammatic and schematic representations of such example embodiments and, accordingly, are not limiting of the scope of the present invention, nor are the drawings necessarily drawn to scale. Well-known devices and processes have been excluded so as not to obscure the discussion in details that would be known to one of ordinary skill in the art.

The invention generally relates to determining a sensor bias in a vehicle sensor, determining a position of an antenna of a Global Navigation Satellite System (GNSS)-receiver and vehicle guidance methods and systems.

An object of several embodiments is to improve the performance of navigation systems for vehicles. An object of several embodiments is to permit a faster and more precise determination of position and/or attitude of a vehicle or a component of a vehicle, e.g. with a GNSS-antenna. An object of several embodiments is to permit a better use of implemented sensors. An object of several embodiments is to determine the bias of implemented sensors.

In this specification, the terms "comprises," "comprising," "includes", "including" or any other variation thereof, are intended to cover a non-exclusive inclusion, such that a method, process, article or apparatus that comprises a list of elements does not include only those elements, but may include other elements not expressly listed or inherent to such method, process, article or apparatus. An element preceded by, for example, "comprises a . . . " does not, without more constraints, preclude the existence of additional identical elements in the method, process, article or apparatus that comprises the element.

The invention relates to a method for guiding or navigating a vehicle and more specifically for determining the actual position and/or attitude of such a vehicle or part of the vehicle. Embodiments of the invention rely on a method for determining a position of an antenna of a GNSS-receiver and a corresponding method for determining a sensor bias in a vehicle sensor. The knowledge of this bias allows an improvement in vehicle guidance.

Figure 1:
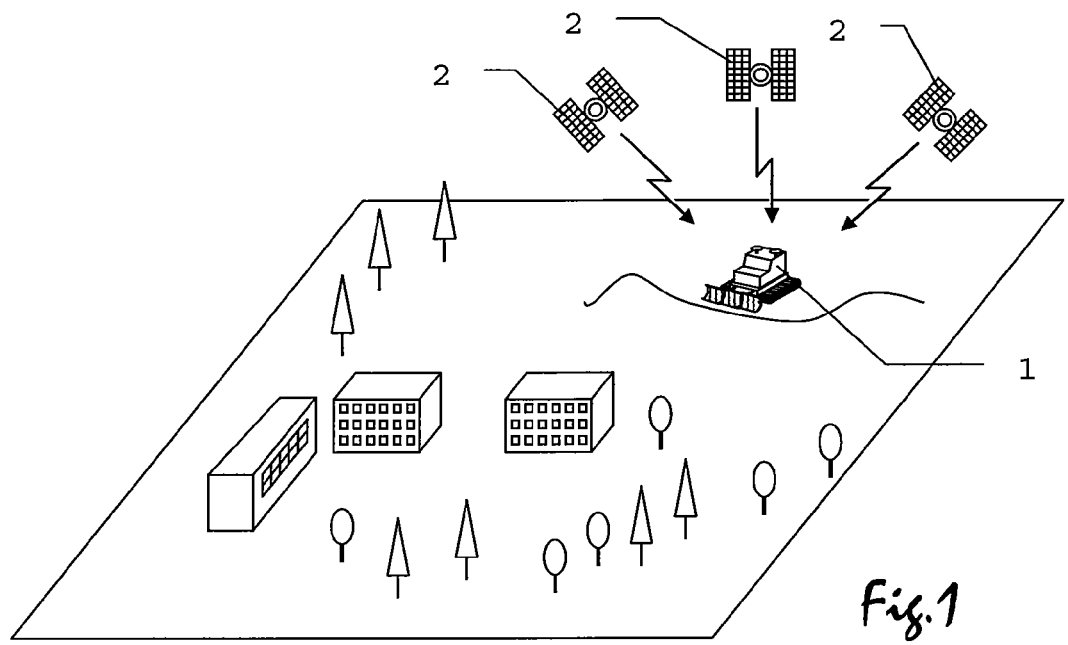
FIG. 1 shows navigating a vehicle using a satellite based positioning system in a schematic view.

FIG. 1 shows an example for navigating an earth-moving vehicle 1 that uses a satellite-supported positioning system. The aim is to determine the position of at least one point on the vehicle 1 by this system. The actual position can be derived from the signals of the satellites 2, signals from which are received by satellite receivers on the vehicle.

Figure 2:
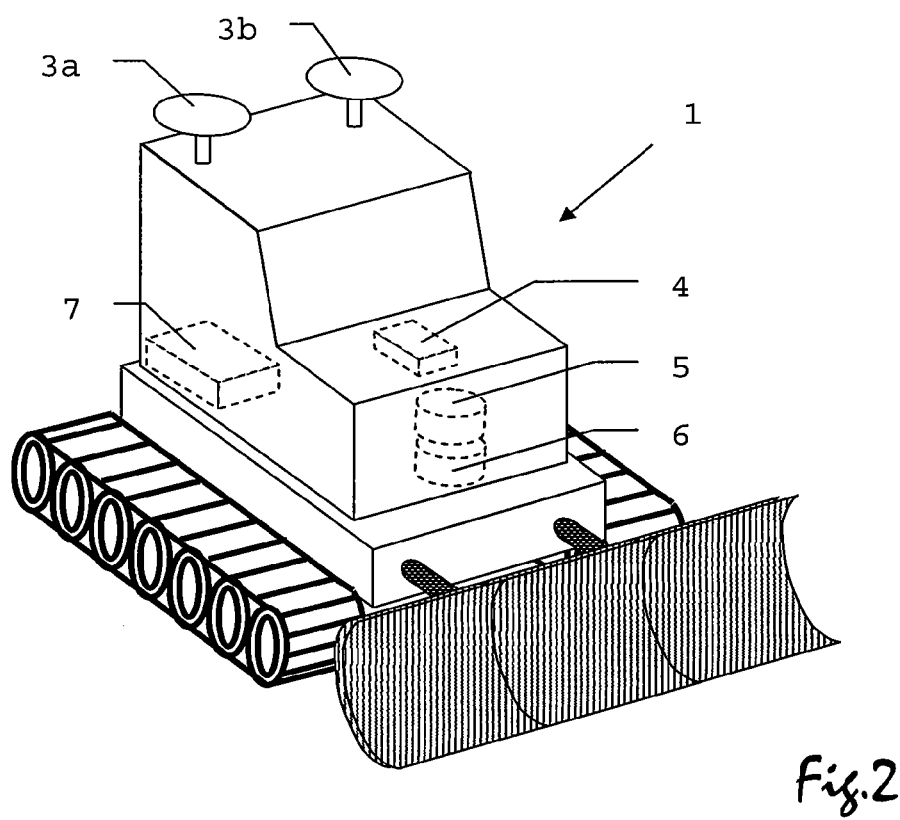
FIG. 2 shows a vehicle with sensor components in a schematic view.

FIG. 2 shows the earth-moving vehicle 1 with various sensor components in a schematic view. On the top of the vehicle 1, two antennae 3a and 3b for GNSS-sensors are mounted for receiving GNSS-signals of a global positioning system. The system used for navigation comprises two receivers for GNSS-signals with significant differences in the technology they rely upon, e.g. Leica ME3 and u-blox Antaris. The primary antenna 3a corresponds to a primary GNSS-receiver with survey-grade precision, i.e. the receiver is adapted to resolve the GNSS phase ambiguities and to determine its position in the centimetre range. The secondary antenna 3b belongs to a secondary GNSS-receiver with a lower positional resolution, but it is also capable of providing carrier-phase measurements. Both antennae 3a and 3b are connected by an antenna vector between primary antenna 3a and secondary antenna 3b.

Within the structure of the vehicle 1, several physical sensor components for generating physical data indicative of positional changes and/or attitude of at least a part of the vehicle are integrated. In this specific example, the vehicle 1 comprises an accelerometer component 4, a magnetometer component 5 and an angular rate sensing component 6, comprising at least a roll rate sensor and/or a yaw rate sensor. The measurement data generated by the components 4, 5, 6 are processed by a data processing unit 7 coupled to be in communication with the components 4, 5, 6. In other embodiments, several other types of external sensing or inertial sensors can be used as alternative or supplementary sensors, e.g. an inclinometer, a compass, an altimeter. According to some embodiments, the components can be realized as micro electro-mechanical structures (MEMS).

Figure 3:
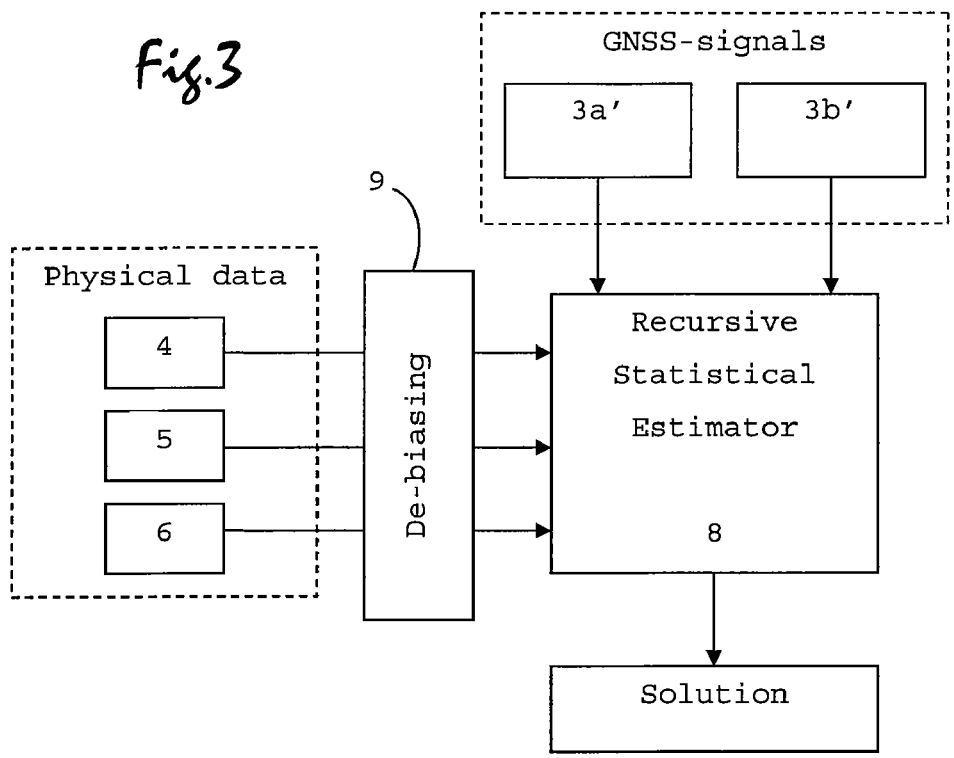
FIG. 3 shows the combination of physical data and GNSS signals for navigating a vehicle in a schematic view.

The GNSS-signals received by the GNSS-receivers and the physical data generated by accelerometer component 4, magnetometer component 5 and angular rate sensing component 6, are used for navigating the vehicle 1. With reference to FIG. 3, one approach for data fusion is the application of a recursive statistical estimator 8, such as a Kalman Filter, an extended Kalman filter, a complementary filter or an adaptive filter. Processing in the recursive statistical estimator 8 uses a system dynamic model describing time-dependent effects on the physical sensors. FIG. 3 shows the fusion of the GNSS-signals and the physical data generated by the components 4, 5, 6 by the recursive statistical estimator 8 to generate position and velocity solutions to navigate the vehicle 1. In accordance with embodiments of the present invention, de-biasing processing 9 of the raw outputs of the physical sensors 4, 5, 6 occurs prior to utilization of the raw outputs by the recursive statistical estimator 8.

For the purpose of vehicle guidance, the position of the vehicle 1 based on GNSS-signals, acceleration, magnetic field and angular rate measurements is determined. Primary and secondary GNSS-receivers are at least temporarily receiving GNSS-signals of the global positioning system. In order to improve the positioning and to allow the use of only one survey-grade receiver, according to embodiments of the present invention, the bias in the physical sensors 4, 5, 6 is estimated and compensated for as described in further detail hereinafter. The compensation is based on a bias determination by comparing the raw (biased) measurements from the inertial sensors with a GNSS-derived attitude derived from the relative positions of antennae 3a and 3b. The position of the primary antenna 3a is precisely determined by the received GNSS-signals, whereas the position of the secondary antenna 3b is always relative to the first antenna 3a, and is determined on the basis of GNSS-signals and the estimated antenna vector. Although the secondary GNSS-receiver is not capable of directly determining the absolute location of its secondary antenna 3b with survey-grade resolution, the estimated position helps in solving the carrier-phase ambiguities when referenced to the primary antenna 3a. The antenna vector between the primary and secondary antenna 3a and 3b is estimated on the basis of roll and yaw estimates. The roll estimate is based on measurements from the accelerometer component 4 and the angular rate sensing component 6 and the yaw estimate is based on measurements from the magnetometer component 5 and the angular rate sensing component 6, and the direction of travel of the primary antenna 3a while the vehicle 1 is moving. The data, e.g. vehicle heading, determined from the time series of primary antenna positions, magnetometer heading, angular rate data, particularly yaw and/or roll rate, and accelerometer data, are processed by applying the recursive statistical estimator 8 for data fusion. Determined bias values, e.g. acceleration and/or angular rate bias values, can be stored in a table, and additional interpolated and extrapolated values can be determined therefrom as described in further detail hereinafter.

Figure 4:
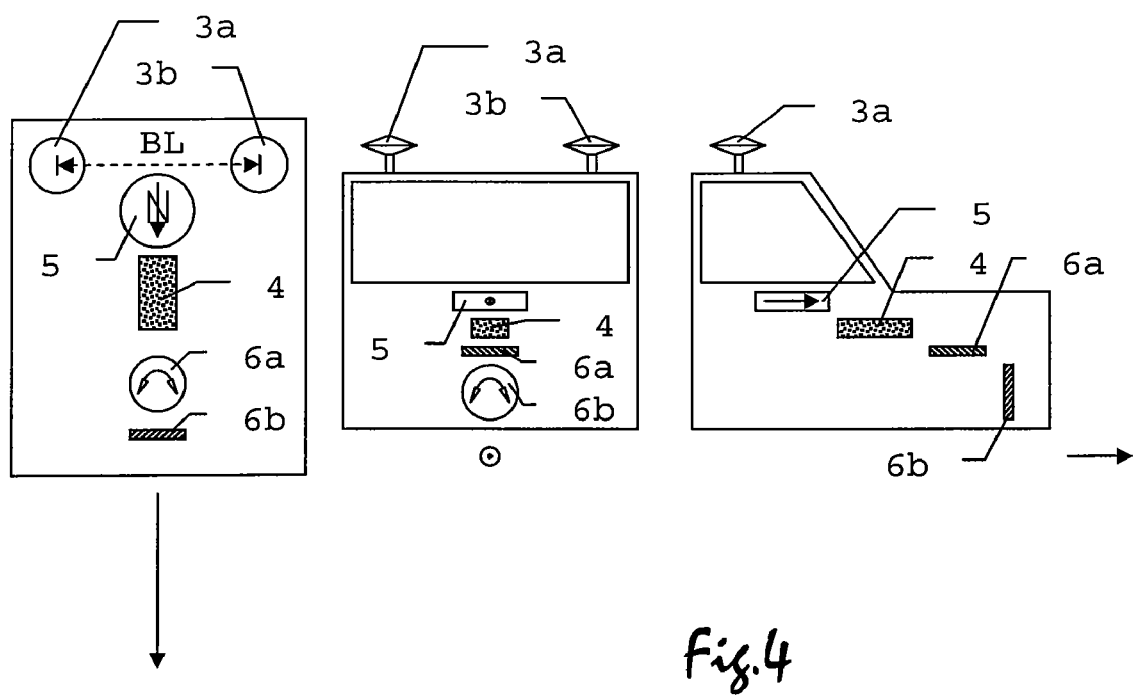
FIG. 4 shows a vehicle and the placement of different sensor components from different sides in a schematic view.

FIG. 4 shows the placement of different sensor components within the vehicle 1 from different sides in a schematic view. FIG. 4 shows, from left to right, a top view, a front view and a view from the left side of the vehicle 1. The primary antenna 3a and the secondary antenna 3b are fixed on the top of the vehicle, e.g. on the roof of the driver's cabin. The baseline BL between the antennae 3a and 3b defines the antenna vector. The accelerometer component 4, the magnetometer component 5, a yaw rate sensor 6a and a roll rate sensor 6b are located within the structure of the vehicle 1. Yaw rate sensor 6a and roll rate sensor 6b are elements of the angular rate sensing component 6.

Figure 5:
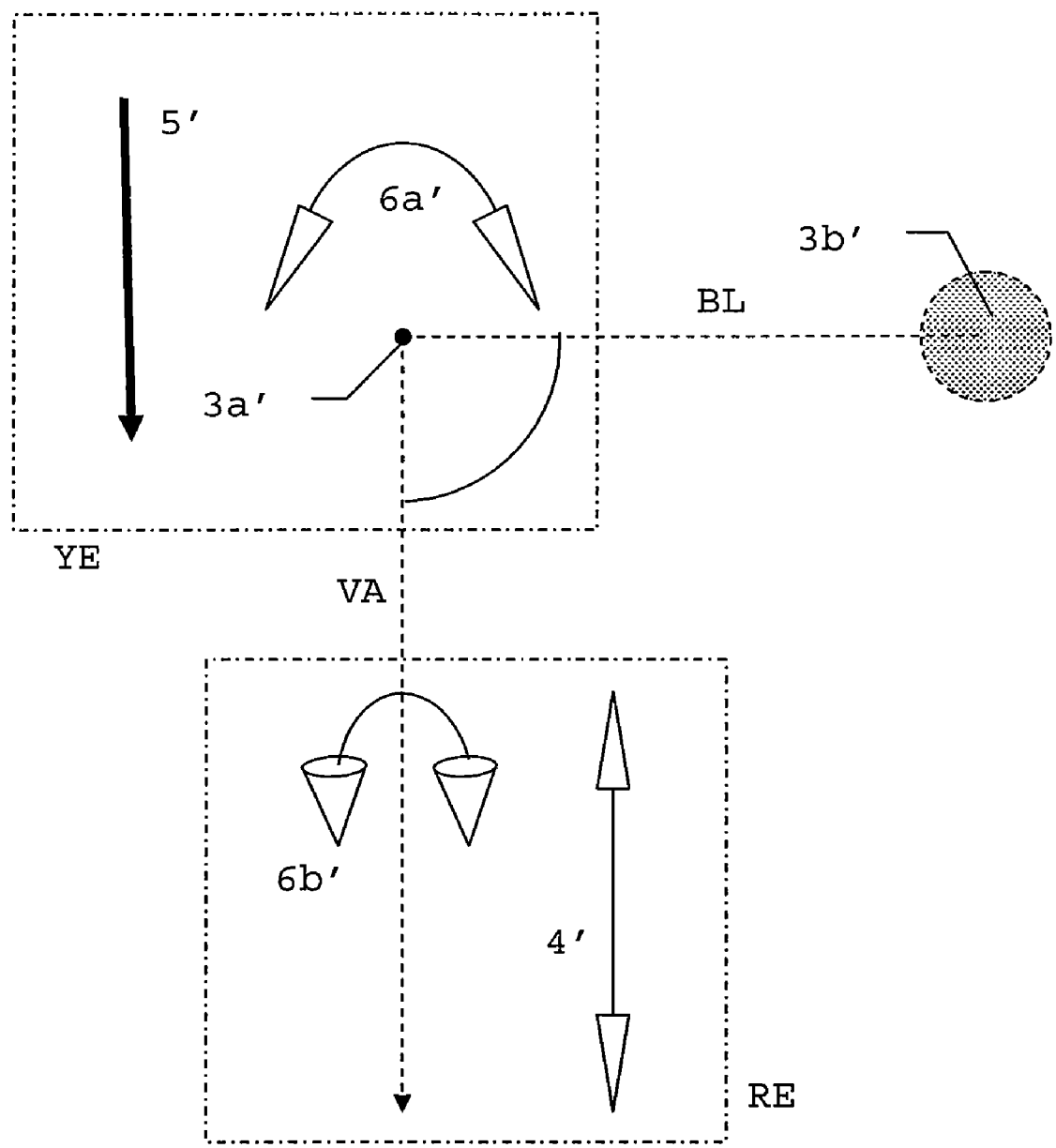
FIG. 5 illustrates the set of measurement data and estimates.

FIG. 5 illustrates the set of measurement data and corresponding estimates. The primary antenna position 3a' is determined with sufficient resolution, i.e. with geodetic resolution, by directly processing GNSS-signals. Due to the design of the secondary receiver, the corresponding secondary antenna position 3b' is less precise than that of the primary antenna 3a'. In FIG. 5, the accuracy with which the positions of the primary and secondary antennae 3a', 3b' are known is illustrated schematically by the relative sizes of the circles representing the two antennae. Both positions 3a' and 3b' are connected by the baseline BL, the length of which is known and which is perpendicular to the vehicle axis VA. A yaw estimate YE is calculated from magnetometer heading 5' and yaw rate 6a'. A roll estimate RE is based on accelerometer measurement 4' and roll rate 6b'.

The problem of determining roll to the required standard of accuracy on a conventional vehicle using the sensor set described above is significantly more difficult than the problems of determining pitch and yaw. As soon as the vehicle moves, an idea of the yaw is derivable. In addition, the magnetometer gives an indication of yaw while the vehicle is stationary, albeit influenced by magnetic anomalies and disturbances. Additionally, as soon as the vehicle moves, an idea of pitch is given due to the change in vehicle height as recognized by the GPS receiver. Since typical vehicles do not move laterally in normal operation, no assistance from the single high performance GNSS receiver is received in determining roll.

Under certain conditions the two receivers will have some difficulty determining attitude. Therefore, it is clear that periods in which it is impossible to determine attitude should be expected. The solution to the problem of gaps between GNSS solutions occurring is to use the aforementioned sensor combination, i.e. based on the combination of MEMS sensor outputs and GNSS data. In accordance with embodiments of the present invention, the bias in the raw sensor data is removed prior to combination with the GNSS data.

These biases are assumed to be sufficiently stable for the expected period between subsequent GNSS updates. For MEMS technology the primary determinant of short term sensor bias changes will be temperature changes and since the MEMS sensors will be housed in a climate controlled operator cabin, those temperature changes are reasonably constrained, thus reducing the likelihood of sudden and significant shifts during normal operation.

By using additional physical sensors, e.g. MEMS sensors, in order to determine roll, the requirement on the pair of GNSS receivers is reduced from that of continuous updates to being one of producing occasional updates. While this is a lesser challenge, it remains a significant one.

The position of the high-performance primary antenna 3a is precisely determinable by reliable techniques and so the availability of such a precise position is assumed. The relatively short distance between the two antennae is also known since they are rigidly mounted on the vehicle 1. So if a reasonable estimate of the direction of the vector between the two antennae 3a, 3b is given, then an apriori estimate of the position of the secondary antenna 3b connected to the less precise GNSS receiver is available by extrapolating from the known position of the primary antenna 3a. Hence, the position of the secondary antenna 3b is not determined in absolute terms, but rather as an offset relative to the primary antenna 3a.

This apriori estimate can be used to guide the determination and validation of integer ambiguities for the secondary receiver. This will make the precise and reliable determination of the position of the secondary antenna 3b connected to the less precise GNSS receiver much easier. It will provide the means to reject wrong solutions and to identify the expected problems, such as cycle slips. In this way, the problem of the lower quality of the secondary receiver is addressed because it is possible to refuse solutions that are affected by poor quality data, since only intermittent solutions are needed as discussed above.

So the problem of the determination of roll using the GNSS receivers is reduced to one of determining the approximate direction of the vector between the antennae 3a, 3b.

An approximate vector between the two antennae 3a, 3b is determined from the roll estimate RE and the yaw estimate YE. The roll estimate RE is determined from the accelerometer component 4 and the angular rate sensing components 6a, 6b. This estimate may be subject to some bias if no GNSS attitude has yet been determined. The yaw estimate YE is determined from the magnetometer component 5 and the angular rate sensor component 6 sensitive to yaw rate. It is assumed that there has been some vehicle motion that allows an approximate initial estimate of any magnetic anomaly to be made.

Since the distance between the primary and secondary antennae 3a, 3b is small, an expected error in roll and yaw of less than five degrees will result in an expected error in the position of the secondary antenna 3b of only a few centimetres. Information about this expected error can be passed to integer determination and verification routines in the data processing unit 7 so that any returned results will have taken this expected error into account. As such, embodiments of the present invention are very tolerant of errors in MEMS supplied roll estimates and the magnetometer supplied yaw estimates.

It is noted that the vector direction is relatively insensitive to vehicle pitch, since the two antennae 3a, 3b will be mounted in a line perpendicular to the direction of motion. However, there are some second order effects as set forth below.

All calculations below are carried out with the following conventions:

All calculations are done in the locally level North, East, Up (NEU) frame. Work could be done in any coordinate frame, however the NEU frame seems best to convey the concept in the most intuitively appealing manner. The techniques to convert from NEU to Latitude, Longitude & Height (LLH) or Earth Centred, Earth Fixed (ECEF) coordinates are well established and not repeated here. Units of measure for North, East and Up are in metres.

In the local vehicle coordinate frame, the local vehicle X axis points in the direction the vehicle 1 would move if it traveled forward without turning. The local vehicle Z axis points directly up through the roof of the vehicle 1, the Y axis is perpendicular to the X and Z axes (thus perpendicular to the direction of motion) and is positive to the right.

Yaw is determined as being clockwise positive from North and yaw units are in radians.

Pitch is determined as being positive if a point on the positive x axis of the vehicle 1 has higher elevation in NEU frame than the vehicle's coordinate origin. Pitch units are in radians.

Roll is determined as being positive if the platform is leaning to the right and roll units are in radians. It may help here to understand that the pitch and roll of the vehicle 1 will be limited to fairly small values and certainly less than 20 degrees.

The convention used here for Euler angles is that when interpreting the orientation of the vehicle 1, we begin with a level vehicle with the forward axis (X axis) pointed North and apply the yaw, then the pitch and finally the roll. This order eliminates potential ambiguity in interpreting the vehicle attitude.

It is assumed that the position of the primary antenna 3a in the aforementioned two antennae setup has been accurately determined in the locally level frame as having coordinates $(n_P, e_P, u_P)$ with expected errors $(\sigma_{n_P}, \sigma_{e_P}, \sigma_{u_P})$.

The platform yaw is given as Y with an expected error of $\sigma_Y$. The platform pitch is given as P with an expected error of $\sigma_P$. The platform roll is given as R with an expected error of $\sigma_R$. The length of the vector between the two antennae is given by D. The vector between the two antennae along the vehicle Y axis in NEU coordinates is thus given by:

$$\vec{D} = D(\cos(R)\cos(Y) + \sin(R)\sin(Y)\sin(P))\hat{e} + D(\sin(R)\cos(Y)\sin(P) - \cos(R)\sin(Y))\hat{n} - D\sin(R)\cos(P)\hat{u} \quad (1)$$

Before ambiguities in the secondary antenna 3b are initially resolved, yaw and roll errors are expected to be most important and the pitch error is expected to be quite small in relative terms. As such, the pitch error is ignored when roughly estimating the likely errors in the vector of interest. Also, the pitch itself is expected to be small and first order Taylor series approximations for it, i.e. $\sin\theta=\theta$ and $\cos\theta=1$, are made when determining expected errors in the vector.

Since roll is small, the Up coordinate of the vector can be approximated as:

$$D_u = DR \quad (2)$$

This makes it clear that the expected Up error is approximately:

$$\sigma_{D_u} = D\sigma_R \quad (3)$$

For the purposes of considering errors and given that P is small, the East coordinate of the vector can be approximated as:

$$D_e = D\cos(Y) \quad (4)$$

This makes it clear that the East coordinate is relatively insensitive to errors when the vehicle is pointing either due North or due South and most sensitive to error when the vehicle is pointing either due East or due West.

This means the expected error in the East coordinate is:

$$D_e = D\cos(Y)\sigma_Y \quad (5)$$

It can similarly be shown that the expected error in the North coordinate is:

$$D_n = D\sin(Y)\sigma_Y \quad (6)$$

So the largest expected error in either the East or the North coordinate (although never occurring at the same time) is $D\sigma_Y$.

Since the position of the secondary antenna 3b is determined relative to the primary antenna 3a using established differential GNSS techniques, the total expected error in the apriori estimate for the secondary antenna 3b is independent of the expected errors in the position of the primary antenna 3a.

It should be recognized that the attitude determined by the local physical sensors (i.e. the magnetometer and MEMS) is expected to have errors that are independent of the errors in the estimate of the primary antenna position. As such when combining the two quantities by using the recursive statistical estimator 8, the expected error will be less than the sum of the two errors.

The worst case error will only appear in the brief period after initial startup and before the first time that ambiguities are resolved for the secondary antenna 3b.

This estimate also assumes no available look up table of errors for the same local non-GPS sensors determined using the above techniques during previous operation with the same data processing unit 7 (platform) mounted in the same way within the same vehicle.

To make a quantitative estimate of the size of the expected errors in the seed position, it is assumed that the antennae 3a, 3b are separated by 30 centimeters so that D=30 cm.

If the expected roll error is 0.1 radians, from the previous section the expected error in the Up coordinate is 3 cm. If the uncertainty of the Up estimate from the primary antenna 3a is less than 2 centimeters, it is expected that the Up error is less than 5 centimeters.

For estimating North and East coordinate errors, worst case Yaw is assumed for each case, which cannot happen at the same time.

If the same assumption is made that the expected Yaw error is less 0.1 radians and that the North and East errors are 2 centimeters, the same result is derived in that the expected error in each dimension is less than 5 cm.

As discussed above, if in practice a correct Gaussian summing of the non-GPS and GPS errors is performed, it can be expected that the expected errors will be noticeably smaller. If in addition the actual yaw is taken into account, the expected errors will be small again in at least one of the North or East dimensions and probably both.

It is highly likely that it is possible to produce roll and yaw estimates that have expected errors that are much, much smaller than 0.1 radians, after the very first time the secondary antenna 3b has achieved a fix allowing de-biasing to commence. The implication of this might be that the first fix takes somewhat longer than subsequent fixes, since subsequent fixes take advantage of a very small error window. It seems possible that the expected error in the apriori estimate for the second antenna 3b might approach one centimeter after the first fix of the secondary antenna is in.

Altogether, the approach is based on the principle that the approximate estimate from the MEMS roll and the magnetometer yaw are de-biased before they are combined with GNSS (multi-antenna) data in the recursive statistical estimator 8, such as a Kalman filter. This finally produces a roll estimate RE with the required properties of low-latency, high-accuracy and high reliability in a low complexity package.

Accelerometers alone will tend to produce a very noisy roll estimate RE principally due to the vibration of the vehicle 1. By using the recursive statistical estimator 8, such as a Kalman filter, to achieve data fusion between the accelerometers 4 and the angular-rate sensor 6, the issue of vibration induced noise on the accelerometers 4 can be eliminated while retaining excellent dynamic response thus achieving the objective of low latency.

It is not necessarily important to separate the sources of the bias error, whether from the accelerometers 4 or from the angular rate sensors 6. However, it is possible to do so by recognizing that the platform is not expected to complete a 360° revolution in the roll axis or pitch axis. The implication of that constraint is that the average long term roll rate and pitch rate is zero, so the average measured long term roll rate, i.e. raw sensor data, will be equal to the roll rate sensor bias. A similar statement can be made for the pitch rate bias.

When a GNSS determined roll becomes available, perhaps sporadically as described above, according to some embodiments of the invention, the GNSS determined roll can be transformed into the appropriate measurement domain (for example to estimate the direction of acceleration due to gravity from the fixed perspective of a tilted vehicle) and subtracted from the MEMS sensor measurements where the measurements are synchronized for the same instant in time. The difference is the MEMS sensor bias. In this embodiment, the GPS determined roll is unbiased.

However, in other embodiments, the GNSS determined roll may be biased, for example, if the antennae 3a, 3b are mounted in uneven mounting positions or due to internal antenna phase centre variations. However, this can be calibrated for by performing a static survey between the antennae over, e.g. 20 minutes, when the vehicle 1 is not moving and it is assumed that the vehicle is stationary on a completely flat plane. Alternatively, the survey is done once and then repeated on the same spot with the vehicle 1 rotated 180 degrees.

Furthermore, precise synchronization of the GNSS determined roll and the MEMS sensor measurements is not necessary. Providing the samples originate from roughly the same time period, a sufficiently good estimate of the sensor bias can be obtained. In such embodiments, a windowed averaging method can be employed in which the difference between the data sample means can be used as an estimate of the bias. Where the sample windows are not precisely synchronized, the sample means contain a residual bias. Consider the scenario in which L MEMS determined roll samples and GNSS determined roll samples overlap. The sample mean μb for the MEMS sensor measurement samples Rj containing M samples is expressed as:

$$\mu_b = \frac{1}{M}\sum_j^M R_j \quad (7)$$

$$= \frac{1}{L}\sum_j^M R_j + \frac{1}{M-L}\sum_j^{M-L} R_j$$

Since the sample mean changes over time, two means are defined such that $\mu_L$ is the sample mean for Rj for samples 1 to L and $\mu_M$ is the sample mean of Rj for samples (L+1) to M.

$$\mu_b = \frac{L\mu_L + (M-L)\mu_M}{M} \quad (8)$$

$$= \frac{L\mu_L}{M} + \frac{(M-L)\mu_M}{M}$$

$$= \frac{L\mu_L}{M} + \left(1 - \frac{L}{M}\right)\mu_M$$

It can be seen from this that in order to minimize the residual bias in the sample mean $\mu_b$, $$\frac{L}{M}$$

must approach unity. This can be achieved by minimizing the amount of samples that do not overlap and maximizing the number of samples M.

The variance of $\mu_b$ is calculated such that:

$$\mathrm{var}[\mu_b] = \left(\frac{L}{M}\right)^2 \frac{\sigma_L^2}{M} + \left(1 - \frac{L}{M}\right)^2 \frac{\sigma_M^2}{(M-L)} \quad (9)$$

In order to minimizes the variance of $\mu_b$, we must make L approach M. Using the limit as M approaches L, the second term converges to zero.

The angular rate sensors 6 can be de-biased if the vehicle 1 is assumed not to be moving. This can be calculated by measuring the high precision velocity from the primary antenna 3a. The raw angular rate sensor measurements are averaged over a period of time, e.g. 30 seconds, to determine the bias. Their biases can also be calculated whilst the vehicle is moving using the same windowed averaging method used for the accelerometers as described above, only in the angle domain rather than in the acceleration domain.

According to some embodiments, it is assumed that all mounting biases have already been taken into account prior to these calculations for both GNSS sensors and MEMS sensors. One way to be sure that mounting biases are successfully accommodated is to perform a once-only total system calibration procedure whereby the platform roll is estimated using the sensors when the platform is standing on a surface of known slope or instead when facing first in one direction then in precisely the opposite direction on a very flat surface of unknown slope.

The MEMS sensor bias that was determined when a GNSS determined roll estimate was available is retained until such time as a new GNSS roll estimate becomes available permitting a new calculation of MEMS sensor bias.

According to some embodiments, it is feasible that more than just the last sensor bias estimate is retained. In particular, one or more tables of sensor bias estimates against temperature can be determined as more GNSS roll estimates are made. In this case, a snapshot of the already available temperature of the sensor is taken when the MEMS sensor bias is calculated. The current temperature can be used to interpolate and/or extrapolate between values in the lookup table to obtain an instantaneous sensor bias estimate. Such a table provides support, for example, on occasions where the temperature has changed significantly since the last GNSS roll estimate was made.

The temperature dependant bias of the outputs of the MEMS sensors, such as the accelerometer component 4 and the angular rate sensing component 6, are addressed by embodiments of the present invention by the de-biasing processing 9 before they are utilized by the recursive statistical estimator 8.

In particular, according to embodiments of the present invention, 6 independent bias versus temperature tables are maintained, one for each of the X, Y, and Z gyroscopes and one for each of the X, Y and Z accelerometers. Before bias calculations are entered into the temperature tables, they must pass one or more "sanity checks" to eliminate obviously wrong errors that could spoil the tables. One example of a sanity check includes comparing the new bias estimate to the previous bias that was calculated for that temperature. If the new bias estimate differs from the previous bias by more than a predetermined threshold, such as 1 ms−2, the new bias estimate is rejected and the averaging process starts again.

According to some embodiments, if the aforementioned comparison check is passed, the new bias is weighted, for example by 5%, against the old bias such that the new table entry=(0.95×old bias)+(0.05×new bias). This effectively acts as a low pass filter to smooth the bias table entries.

A statistical analysis is performed on the data in the bias versus temperature tables to determine the coefficients of a polynomial curve that best fits the data in the table. This polynomial is used to interpolate and/or extrapolate the temperature bias data to temperatures where meaningful bias information is not yet available. It should also be noted that not all temperatures have corresponding bias estimates at the beginning and the temperature tables are slowly populated over time as the system heats up. Initially a linear curve may be fitted to the sparse data in the table, and higher order polynomials may be fitted when more data points become available in the table.

According to some embodiments, during an initial calibration process, inertial initialization includes averaging the output of the sensors over about 30 seconds to give a rough estimate of the mounting offset. The output of this process is a pair of rotation angles. If, for example, the data processing unit (platform) 7 was mounted at an angle, for example, tilted downwards by 5 degrees, this would yield a positive pitch of 5 degrees.

The GNSS determined roll is used to calculate an estimate of a vector for the direction of acceleration due to gravity in the vehicle frame of reference. If the GNSS determined attitude stated the roll was zero, the GNSS gravity vector would be [0,0,9.8]. This vector is then rotated according to the nominal mounting angles from the vehicle frame of reference to the frame of reference of the platform 7. More often than not, this is a small rotation of, for example, 5 degrees in pitch and for example, plus 90 degrees in yaw, which are averaged over 60 seconds. At the same time, the readings from the accelerometers 4 are averaged over the same 60 seconds. The vector difference between the average gravity vectors in the vehicle frame is equal to estimates for the three X, Y, and Z accelerometer biases in the platform coordinate frame.

The magnetometer 5 presents a number of problems. Firstly the platform can be expected to have significant iron content and thus will distort the magnetic field undermining the yaw estimate determined from the magnetometer. One helpful aspect about such a hard iron anomaly is that it is static. A second estimate of yaw is available from successive positions of the primary GNSS receiver once the platform begins to move. A long term average of the differences between the yaw estimate from the primary GNSS receiver and the magnetometer will reveal the hard iron anomaly.

Another source of iron anomaly is a deposit of iron (or built structure) in the environment in which the vehicle operates, but the location of the source is not connected to the vehicle. In this instance the effect of the iron anomaly on the magnetometer will vary with proximity and orientation of the magnetometer to the iron. However, such iron will either need to be very close to the platform or otherwise be very large in order to have an effect.

Very close anomalies will tend to have short term effects and can be eliminated through the recursive statistical estimator 8, such as a Kalman filter that fuses primary antenna GPS heading, magnetometer reading and angular rate (yaw-rate) sensor information.

Very large anomalies will have an effect on the magnetometer somewhere between that of a platform connected hard iron anomaly and a close iron anomaly and appropriate tuning of the recursive statistical estimator 8, perhaps with some simple external diagnostic algorithms, are sufficient to estimate the anomaly closely enough.

Another source of bias is magnetic disturbance from electronic devices on the platform. A particularly troublesome device would be audio speakers located close to the magnetometer. In this case the audio speakers will include magnets that will directly alter the field. The magnets in the speakers will present themselves in a similar way to the hard iron anomaly mentioned above and will be solved through that technique.

A potentially more troublesome problem will be fluctuation of the field intensity of the electromagnets that drive the speakers by interacting with the magnets. It can be expected that the high frequency field fluctuation will be readily solved through the same technique that is used to eliminate vibration in the Y accelerometer in the virtual roll sensor. That is the yaw-rate sensor is used to provide excellent dynamic yaw response, absent the high frequency noise due to a nearby fluctuating magnetic field.

It will be appreciated by one of ordinary skill in the art that the data processing unit 7 includes a processor, such as a standard microprocessor, for implementing embodiments of the invention as described herein. For example, the processor can be operatively coupled to a storage medium in the form of a memory. The memory comprises a computer readable medium, which comprises computer readable program code components for vehicle guidance and sensor bias determination in accordance with the teachings of the present invention, at least some of which are selectively executed by the processor and are configured to cause the execution of the embodiments of the present invention described herein.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for guiding a vehicle comprising:
   at least temporarily receiving GNSS-signals of a global positioning system using a primary antenna of a primary survey-grade GNSS-receiver and a secondary antenna of a secondary GNSS-receiver mounted to the vehicle;
   generating physical data indicative of respective measured physical parameters of at least part of the vehicle, the measured physical parameters being measured by a plurality of physical sensors;
   de-biasing the physical data;
   applying a recursive statistical estimator to the de-biased physical data and an output of the primary and secondary GNSS-receivers to determine a position and velocity of the vehicle;
   estimating a bias in the physical data, or a quantity derived therefrom, generated by one or more of the plurality of physical sensors;
   comparing the bias estimate with a previous bias estimate for the same temperature; and
   storing the bias estimate in a bias versus temperature table if the difference of the comparison is within a predetermined threshold.

2. The method of claim 1, further comprising weighting the bias estimate against the previous bias estimate to smooth entries in the bias versus temperature table.

3. The method of claim 1, further comprising fitting a polynomial curve to the bias estimates in the bias versus temperature table to interpolate and/or extrapolate the bias estimate to temperatures where bias estimates are not yet available.

4. A method for guiding a vehicle comprising:
   at least temporarily receiving GNSS-signals of a global positioning system using a primary antenna of a primary survey-grade GNSS-receiver and a secondary antenna of a secondary GNSS-receiver mounted to the vehicle;
   generating physical data indicative of respective measured physical parameters of at least part of the vehicle, the measured physical parameters being measured by a plurality of physical sensors;
   de-biasing the physical data;
   applying a recursive statistical estimator to the de-biased physical data and an output of the primary and secondary GNSS-receivers to determine a position and velocity of the vehicle; and
   applying a recursive statistical estimator to the de-biased physical data and an output of the primary and secondary GNSS-receivers to determine a position and velocity of the vehicle estimating a bias in an attitude sensor measurement for the vehicle determined from at least some of the plurality of physical sensors by subtracting a transformed roll estimate determined from the GNSS signals from the attitude sensor measurement where the measurements from the GNSS signals and the measurements from at least some of the plurality of physical sensors are synchronized in time.

5. A method for guiding a vehicle comprising:
   at least temporarily receiving GNSS-signals of a global positioning system using a primary antenna of a primary survey-grade GNSS-receiver and a secondary antenna of a secondary GNSS-receiver mounted to the vehicle;
   generating physical data indicative of respective measured physical parameters of at least part of the vehicle, the measured physical parameters being measured by a plurality of physical sensors;
   de-biasing the physical data;
   applying a recursive statistical estimator to the de-biased physical data and an output of the primary and secondary GNSS-receivers to determine a position and velocity of the vehicle; and
   estimating a bias in a sensor measurement from at least some of the plurality of physical sensors by performing windowed averaging of transformed roll estimates determined from the GNSS signals and sensor measurements from at least some of the plurality of physical sensors where the roll estimates determined from the GNSS signals are not synchronized in time with the sensor measurement from at least some of the plurality of physical sensors.

6. A method for guiding a vehicle comprising:
   at least temporarily receiving GNSS-signals of a global positioning system using a primary antenna of a primary survey-grade GNSS-receiver and a secondary antenna of a secondary GNSS-receiver mounted to the vehicle;
   generating physical data indicative of respective measured physical parameters of at least part of the vehicle, the measured physical parameters being measured by a plurality of physical sensors;
   de-biasing the physical data;
   applying a recursive statistical estimator to the de-biased physical data and an output of the primary and secondary GNSS-receivers to determine a position and velocity of the vehicle; and
   estimating a bias in a sensor measurement based on measurements from an accelerometer component and an angular rate sensing component by performing windowed averaging of sensor measurements in the fixed vehicle reference frame.

7. A method for guiding a vehicle comprising:
   at least temporarily receiving GNSS-signals of a global positioning system using a primary antenna of a primary survey-grade GNSS-receiver and a secondary antenna of a secondary GNSS-receiver mounted to the vehicle;
   generating physical data indicative of respective measured physical parameters of at least part of the vehicle, the measured physical parameters being measured by a plurality of physical sensors;
   de-biasing the physical data;
   applying a recursive statistical estimator to the de-biased physical data and an output of the primary and secondary GNSS-receivers to determine a position and velocity of the vehicle, wherein the recursive statistical estimator is one of the following: a Kalman filter; an extended Kalman filter; a complementary filter; an adaptive filter.

8. An apparatus for guiding a vehicle comprising a tangible computer readable storage medium, which comprises:
   computer readable program code components stored on the computer readable medium and configured to cause-at least temporary reception of GNSS-signals of a global positioning system by a primary antenna of a primary survey-grade GNSS-receiver and a secondary antenna of a secondary GNSS-receiver mounted to the vehicle;
   computer readable program code components stored on the computer readable medium and configured to cause a the generation of physical data indicative of respective physical parameters of at least part of the vehicle measured by a plurality of physical sensors;
   computer readable program code components stored on the computer readable medium and configured to cause de-biasing of the physical data;
   computer readable program code components stored on the computer readable medium and configured to cause-determination of a position and velocity of the vehicle by applying a recursive statistical estimator to the de-biased physical data and an output of the primary and secondary GNSS-receivers; and comparing the bias estimate with a previous bias estimate for the same temperature and storing the bias estimate in a bias versus temperature table if the difference of the comparison is within a predetermined threshold.

9. The apparatus of claim 8, further comprising computer readable program code components stored on the computer readable medium and configured to cause estimating a bias in the physical data, or a quantity derived therefrom, generated by one or more of the plurality of physical sensors.

10. The apparatus of claim 8, further comprising computer readable program code components stored on the computer readable medium and configured to cause estimating a bias in an attitude sensor measurement for the vehicle determined from at least some of the plurality of physical sensors by subtracting a transformed roll estimate determined from the GNSS signals from the attitude sensor measurement where roll estimates determined from the GNSS signals and the measurements from at least some of the plurality of physical sensors are synchronized in time.

11. The apparatus of claim 8, further comprising computer readable program code components stored on the computer readable medium and configured to cause estimating a bias in a sensor measurement from at least some of the plurality of physical sensors by performing windowed averaging of transformed roll estimates determined from the GNSS signals and sensor measurements from at least some of the plurality of physical sensors where roll estimates determined from the GNSS signals are not synchronized in time with the sensor measurements from at least some of the plurality of physical sensors.

12. The apparatus of claim 8, further comprising computer readable program code components stored on the computer readable medium and configured to cause estimating a bias in a sensor measurement based on measurements from an accelerometer component and an angular rate sensing component by performing windowed averaging of the measurements in the fixed vehicle reference frame.

13. The apparatus of claim 8, further comprising computer readable program code components stored on the computer readable medium and configured to cause-weighting the bias estimate against the previous bias estimate to smooth entries in the bias versus temperature table.

14. The apparatus of claim 8, further comprising computer readable program code components stored on the computer readable medium and configured to cause fitting a polynomial curve to the bias estimates in the bias versus temperature table to interpolate and/or extrapolate the bias estimates to temperatures where bias estimates are not yet available.

* * * * *